United States Patent
Lee et al.

(10) Patent No.: US 10,659,123 B2
(45) Date of Patent: May 19, 2020

(54) APPARATUS AND METHOD FOR BEAM MANAGEMENT IN WIRELESS COMMUNICATION SYSTEM

(71) Applicant: Samsung Electronics Co., Ltd., Suwon-si, Gyeonggi-do (KR)

(72) Inventors: Namjeong Lee, Suwon-si (KR); Taeyoung Kim, Seoul (KR); Hyunseok Ryu, Yongin-si (KR); Jeongho Park, Seoul (KR); Hyukmin Son, Hanam-si (KR); Peng Xue, Suwon-si (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/802,997

(22) Filed: Nov. 3, 2017

(65) Prior Publication Data

US 2018/0131426 A1    May 10, 2018

(30) Foreign Application Priority Data

Nov. 4, 2016  (KR) .................. 10-2016-0146677

(51) Int. Cl.
*H04K 1/10* (2006.01)
*H04L 27/28* (2006.01)
(Continued)

(52) U.S. Cl.
CPC ......... *H04B 7/0617* (2013.01); *H04B 7/0456* (2013.01); *H04B 7/0626* (2013.01); *H04B 7/0695* (2013.01); *H04W 72/042* (2013.01)

(58) Field of Classification Search
CPC .. H04B 7/0617; H04B 7/0626; H04B 7/0456; H04B 7/0697; H04W 72/042
(Continued)

(56) References Cited

U.S. PATENT DOCUMENTS

2013/0156120 A1 * 6/2013 Josiam ................. H04B 7/0697
                                                          375/260
2015/0289249 A1  10/2015 Noh et al.
(Continued)

FOREIGN PATENT DOCUMENTS

EP    3 501 227 A1   6/2019
WO   2018/056730 A1   3/2018

OTHER PUBLICATIONS

3GPP; 3rd Generation Partnership Project; Technical Specification Group Radio Access Network; Study on elevation beamforming / Full-Dimension (FD); Multiple Input Multiple Output (MIMO) for LTE (Release 13); Jun. 2015; Valbonne, France.
(Continued)

*Primary Examiner* — Phuong Phu
(74) *Attorney, Agent, or Firm* — Jefferson IP Law, LLP

(57) ABSTRACT

A pre-5$^{th}$-Generation (5G) or 5G communication system to be provided for supporting higher data rates beyond 4$^{th}$-Generation (4G) communication system, such as long-term evolution (LTE), is disclosed. The system includes an apparatus of a base station. The apparatus may include: at least one transceiver, and at least one processor connected to the at least one transceiver, where the at least one processor is configured to transmit to a terminal, configuration information of reference signals for beam management regarding a transmit (Tx) beam of the BS or a receive (Rx) beam of the terminal, transmit the reference signals to the terminal, and the configuration information comprises information related to a number of repetitions of the reference signals.

28 Claims, 15 Drawing Sheets

(51) Int. Cl.
*H04B 7/06* (2006.01)
*H04B 7/0456* (2017.01)
*H04W 72/04* (2009.01)

(58) Field of Classification Search
USPC .................................................. 375/260, 346
See application file for complete search history.

(56) References Cited

U.S. PATENT DOCUMENTS

2016/0087707 A1* 3/2016 Guey .................. H04L 27/2607
375/267
2016/0128006 A1  5/2016  Ji et al.
2016/0134352 A1  5/2016  Stirling-Gallacher
2016/0301505 A1  10/2016  Furuskog et al.

OTHER PUBLICATIONS

ZTE, ZTE Microelectronics, Discussion on measurement related reference signal for NR-MIMO, 3GPP TSG RAN WG1 Meeting #86bis, Oct. 10-14, 2016, Lisbon, Portugal, R1-1608674.
ITRI, Discussion on frequency domain reduced overhead CSI-RS, 3GPP TSG RAN WG1 Meeting #86b, Oct. 10-14, 2016, Lisbon, Portugal, R1-1609407.
Samsung, "Discussion on beam management RS", 3GPP Draft, R1-1609079, 3rd Generation Partnership Project (3GPP), vol. RAN WG1, Lisbon, Portugal, Oct. 10, 2016-Oct. 14, 2016, Oct. 9, 2016, XP051149130.
Extended European Search Report dated Jan. 3, 2020, issued in European Patent Application 17867854.6.

\* cited by examiner

APPARATUS AND METHOD FOR BEAM MANAGEMENT IN WIRELESS COMMUNICATION SYSTEM

CROSS-REFERENCE TO RELATED APPLICATION(S)

This application claims the benefit under 35 U.S.C. § 119(a) of a Korean patent application filed on Nov. 4, 2016 in the Korean Intellectual Property Office and assigned Serial number 10-2016-0146677, the entire disclosure of which is hereby incorporated by reference.

TECHNICAL FIELD

The present disclosure relates to wireless communication. More particularly, the present disclosure relates to an apparatus and a method for multiple-input multiple-output (MIMO) and beam management in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long-term evolution (LTE) System'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift key (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for beam management in a wireless communication system on the basis of the above-described discussion.

In accordance with an aspect of the present disclosure, a method of a base station is provided. The method comprises performing a beam reference signal (BRS)-related signaling with a user equipment (UE), for beam management. The method comprises transmitting to a terminal, configuration information of reference signals for beam management regarding a transmit (Tx) beam of the BS or a receive (Rx) beam of the terminal and transmitting the reference signals to the terminal. The configuration information may comprise information related to a number of repetitions of the reference signals.

In accordance with another aspect of the present disclosure, a method of a terminal is provided. The method comprises performing a BRS-related signaling with a base station, for beam management. The method comprises receives, from a base station, configuration information of reference signals for beam management regarding a transmit (Tx beam) of the BS or a receive (Rx) beam of the terminal and receives, from the base station, the reference signals. The configuration information comprises information related to a number of repetitions of the reference signals In accordance with another aspect of the present disclosure, an apparatus of a base station is provided. The apparatus includes at least one transceiver; and at least one processor connected to the at least one transceiver, wherein the at least one processor is configured to perform a BRS-related signaling with a terminal, for beam management. The at least one transceiver is configured to transmit to a terminal, configuration information of reference signals for beam management regarding a transmit (Tx) beam of the BS or a receive (Rx) beam of the terminal, and transmit the reference signals to the terminal. The configuration information may comprise information related to a number of repetitions of the reference signals.

In accordance with another aspect of the present disclosure, an apparatus of a terminal is provided. The apparatus includes at least one transceiver; and at least one processor connected to the at least one transceiver, wherein the at least one processor is configured to perform a BRS-related signaling with a base station, for beam management. The at least one processor is configured to receive, from a base station, configuration information of reference signals for beam management regarding a transmit (Tx) beam of the BS or a receive (Rx) beam of the terminal, and receive, from the base station, the reference signals. The configuration information comprises information related to a number of repetitions of the reference signals Various embodiments of the present disclosure enable operations for a reference signal (RS) configuration for beam management, activation (and/or transmission) of pre-configured resources, and UE reporting on the RS configuration therefor and the activation thereof.

Effects which can be obtained by the present disclosure are not limited to the above-described effects, and other effects which have not been mentioned may be clearly understood by those having ordinary knowledge in the technical field, to which the present disclosure pertains, from the following description.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, by way of example, various embodiments of the present disclosure will be described using a hardware-based approach. However, various embodiments of the present disclosure include technology using both hardware and software, and thus do not exclude a software-based approach.

Hereinafter, the present disclosure relates to an apparatus and a method for beam management in a wireless communication system. Specifically, the present disclosure will describe a signaling for operating a beam and technology for configuring a signaling in a wireless communication system.

Signal-related terms (e.g., a reference signal (RS), a synchronization signal, and a beam RS), terms referring to configuration, terms referring to network entities, terms referring to an element of an apparatus, and the like, which are used in the following description, are exemplified for convenience of description. Accordingly, the present disclosure is not limited to the following terms, and other terms having equivalent technical meanings may be used.

Also, various embodiments of the present disclosure are described using terms according to a certain communication standard (e.g., the Third Generation Partnership Project (3GPP)), but this description is for illustrative purposes only. Various embodiments of the present disclosure may be easily modified and applied to another communication system.

Figure 1:
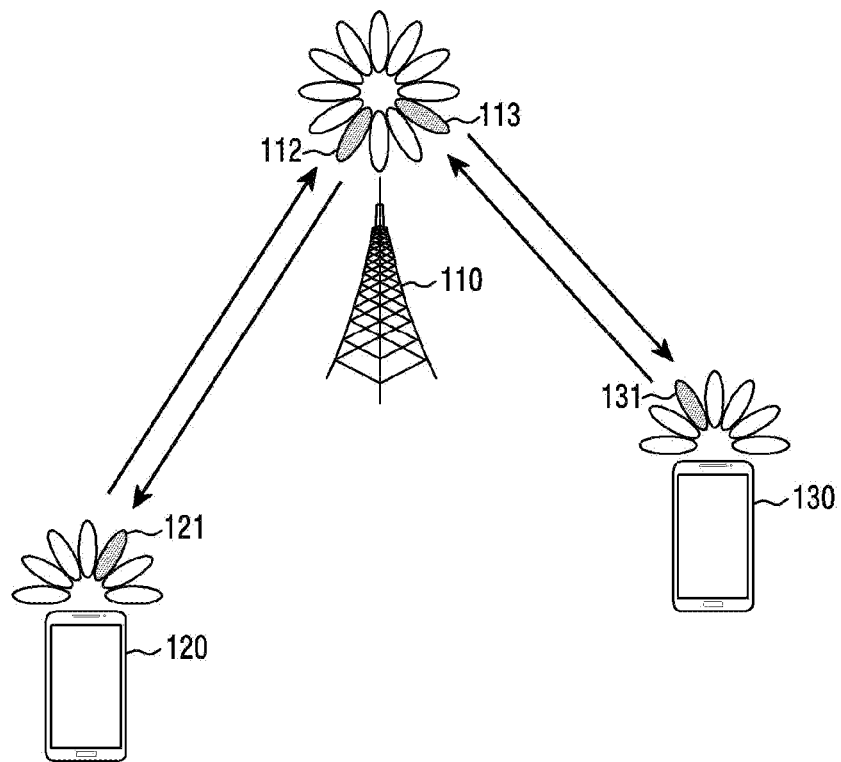
FIG. 1 illustrates a wireless communication system according to various embodiments of the present disclosure.

FIG. 1 illustrates a wireless communication system according to various embodiments of the present disclosure.

Referring to FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE),"

"mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi-co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 2:
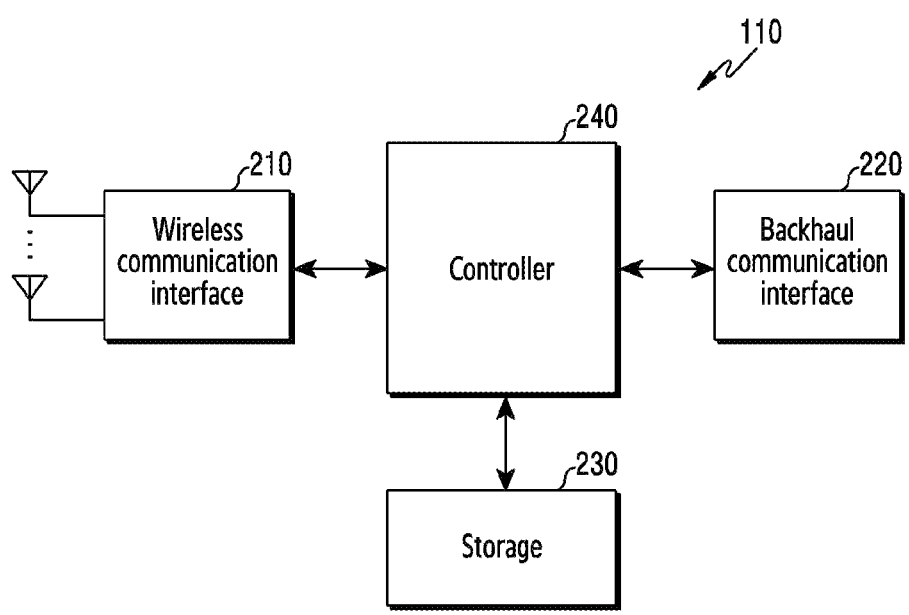
FIG. 2 illustrates the base station (BS) in the wireless communication system according to various embodiments of the present disclosure.

FIG. 2 illustrates the BS in the wireless communication system according to various embodiments of the present disclosure.

A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230 (e.g., a memory), and a controller 240 (e.g., at least one processor).

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into a radio frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. According to various embodiments of the present disclosure, the controller 240 may control the base station to perform operations (i.e. signal configuration, resource setting, report setting) according to the various embodiments of the present disclosure.

Figure 3:
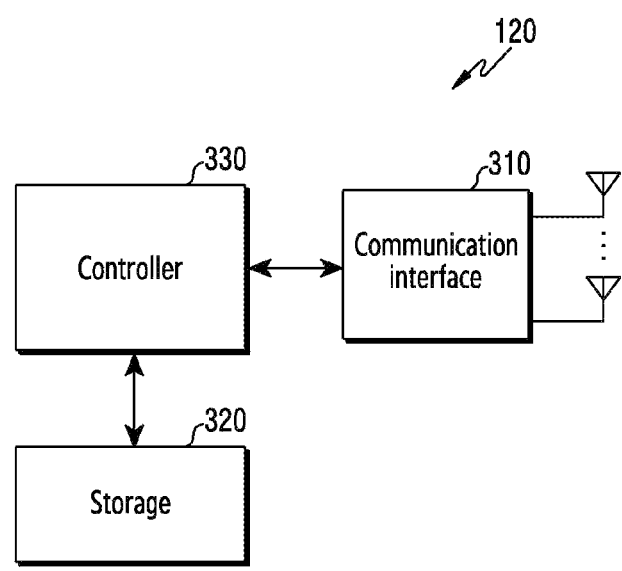
FIG. 3 illustrates the terminal in the wireless communication system according to various embodiments of the present disclosure.

FIG. 3 illustrates the terminal in the wireless communication system according to various embodiments of the present disclosure.

A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320 (e.g., a memory), and a controller 330 (e.g., at least one processor).

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments of the present disclosure, the controller 330 may control the terminal to perform operations (i.e. measurements of signals, reporting of the measurement results) according to the various embodiments of the present disclosure.

Figure 4:
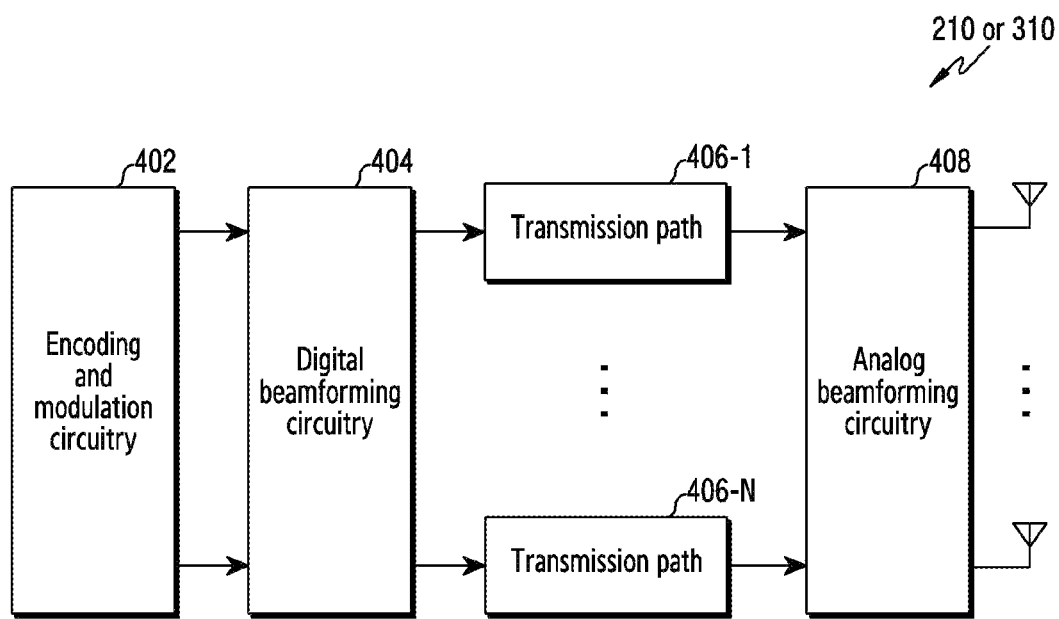
FIG. 4 illustrates the communication interface in the wireless communication system according to various embodiments of the present disclosure.

FIG. 4 illustrates the communication interface in the wireless communication system according to various embodiments of the present disclosure.

FIG. 4 shows an example for the detailed configuration of the wireless communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier (FBMC)) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Various embodiments of the present disclosure relate generally to wireless communication, and more particularly, to base station/UE (e.g., TRP/UE) operations for P-1/P-2/P-3 which correspond to a beam management procedure among MIMO/beam management fields.

Various embodiments of the present disclosure relate to a P-1/P-2/P-3 beam management process and a signaling (e.g., an RS) for the same in a multi-beam-based system. The present disclosure may include operations for RS configuration for beam management, activation (and/or transmission) of pre-configured resources, and UE reporting on the RS configuration therefor and the activation thereof.

Prior to a detailed description of the present disclosure, hereinafter, the meanings of the terms used in the disclosure will be described. 1)~3) will be described with reference to full dimension (FD)-MIMO study item (SI) (TR36.897).

1) Hybrid-beamforming (BF): an architecture for dynamically changing a transceiver unit (TXRU) virtualization weight (i.e., the phase and amplitude of analog BF) over time.

2) Digital-BF: refers to the case of execution of a static TXRU virtualization weight(s). However, digital-BF may represent a form of a change in a digitally-formed beam over time.

3) Single-beam approach: signifies a case where a beam generated by a base station is sufficiently wide and a service area is covered without a sweeping operation.

4) Multi-beam: signifies a case where a beam generated by a base station is narrow and a service area is covered with the need to involve a sweeping operation.

5) Beam sweeping: signifies an action which in order to prevent the occurrence of an angular coverage hole at the time of generation of a beam, adjusts the beam in all directions of a cell during a predetermined time period and transmits a signal (refer to FIG. 1).

Figure 5A:
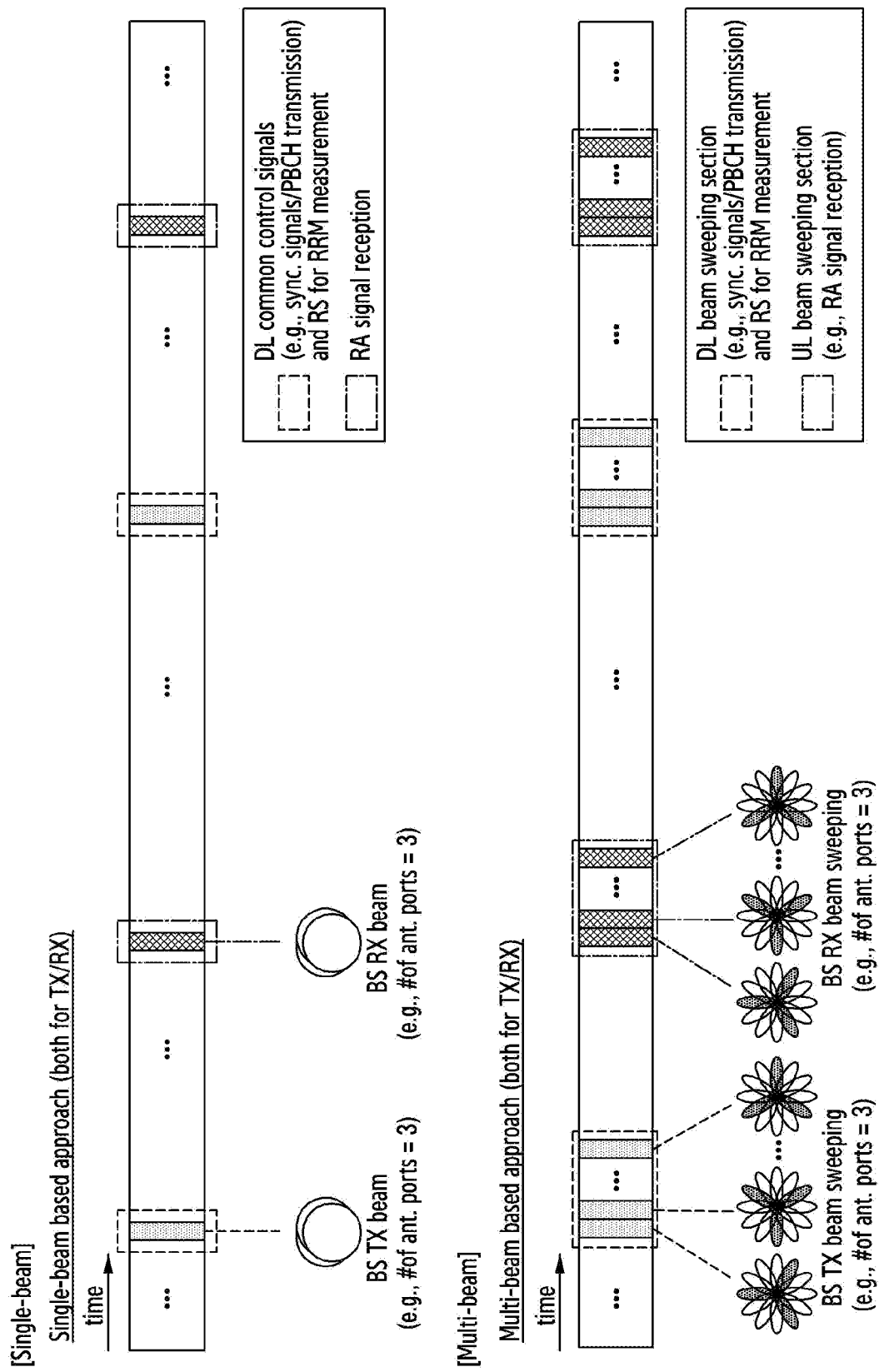
FIG. 5A illustrates examples of single-beam and multi-beam transmission transmission/reception points (TRPs) according to various embodiments of the present disclosure.

FIG. 5A illustrates examples of single-beam and multi-beam transmission TRPs according to various embodiments of the present disclosure.

6) Non-Zero Power channel state information-reference signal CSI-RS (NZP CSI-RS): signifies an RS used for beam measurement in the present disclosure. An RS may be a UE-specific RS. "NZP" is used to distinguish an NZP CSI-RS from a Zero Power CSI-RS (ZP CSI-RS).

7) ZP CSI-RS: is a resource that when a relevant resource (e.g., a frequency/time resource) includes an NZP CSI-RS allocated to a different UE in reception of data by a UE, a base station (e.g., a TRP) notifies the UE of in order to help the UE to be capable of excluding the relevant resource and decoding the data.

8) Beam management procedure P-1: signifies a process for associating a transmission beam of a base station (e.g., a TRP Tx beam) with a reception beam of a UE (e.g., a UE Rx beam).

9) Beam management procedure P-2: signifies a process for refining a transmission beam of a base station (e.g., a TRP Tx beam).

10) Beam management procedure P-3: signifies a process for refining a reception beam of a UE (e.g., a UE Rx beam).

11) Next generation Node B (gNB): may include a single TRP or multiple TRPs. Hereinafter, the term "base station" used in the present disclosure may refer to a single gNB, a single TRP, or a single TRP cluster (i.e., a cluster including multiple TRPs). One gNB may exist in a cell. When each of multiple TRPs or a TRP cluster within each cell operates as a single beam, the cell may be recognized as a single-beam transmission cell. That is, for example, when a single TRP exists in one cell, this case may be expressed as TRP=TRP cluster=gNB=cell.

12) UE: refers to a user equipment.

The present disclosure proposes a utilization scenario of various signalings for the above-described P-1/P-2/P-3 beam management and proposes operations of base station/UE according to the utilization scenario. For beam management, the scenarios shown in Table 1 below may be implemented.

TABLE 1

(Various beam management RS scenarios)

| | P-1 | P-2 | P-3 |
|---|---|---|---|
| Scenario 1 | cell-specific signal (sync signal, new RS, . . . ) | | |
| Scenario 2 | cell-specific signal (new RS, sync signal) | UE-specific RS | |
| Scenario 3 | | UE-specific RS | |
| Scenario 4 | sync signal (i.e., composite beam) + | UE-specific RS | |

TABLE 1-continued (Various beam management RS scenarios)

| P-1 | P-2 | P-3 |
|---|---|---|
| UE-specific RS (- use of smaller amount of resources than that of RS for P-1 of scenario 2 - execution of fine beam association through UE-specific RS) | | |

In Table 1, cell-specific RS configuration may be performed based on

Alt 1. System information,

Alt 2. Message (Msg) 4 of a random-access channel (RACH) process, and

Alt 3. physical downlink shared channel (PDSCH) transmitted after a RACH. In Table 1, a UE-specific RS may be configured through a UE-specific radio resource control (RRC) signaling. Through the RS, a UE may measure the quality, for example, the strength of a signal (i.e., reference signal received power (RSRP)) of a beam for beam management. The UE may transmit IDs and/or corresponding RSRPs of one or more preferred beams, as reporting on the measurement. Hereinafter, the term "UE reporting" may refer to an operation of a UE for feeding back a beam ID and/or RSRP.

According to various embodiments of the present disclosure, a UE-specific RS may be variously configured. For example, the UE-specific RS may be a periodic, semi-static, or aperiodic CSI-RS. An aperiodic UE-specific RS may be configured through an RRC signaling, and may then activate the transmission of a CSI-RS through downlink control information (DCI)/medium access control (MAC)-control element (CE) and the like. A semi-static CSI-RS refers to a type in which the semi-static CSI-RS is periodically transmitted when a configured CSI-RS becomes "on" in DCI/MAC-CE, and is not transmitted when the configured CSI-RS becomes "off" in DCI/MAC-CE.

Hereinafter, for convenience of description, the cell-specific RS and UE-specific RS for beam management shown in Table 1 will be referred to as "beam RS (BRS)" and "CSI-RS", respectively.

Hereinafter, operations of base station/UE for each scenario will be defined. However, the operations described below are described as examples according to various embodiments of the present disclosure, and thus, embodiments of the present disclosure are not limited to the operations of base station/UE described below.

[Scenario 1]

Step 1) Configuration of a BRS

Alt 1. Configuration and utilization of a single BRS for P-1/P-2/P-3, and

Alt 2. Configuration and utilization of a BRS for P-1 (i.e., BRS1) and a BRS for P-2 (i.e., BRS2);

Step 2) P-2 triggering by a TRP or UE when necessary;

Alt 1. Network triggering: sends a request for reporting on information on P-2 through DCI or MAC-CE to the UE, and Alt 2. UE triggering: the UE reports relevant information when recognizing the need of the relevant information; and Step 3) UE reporting for P-2.

Figure 5B:
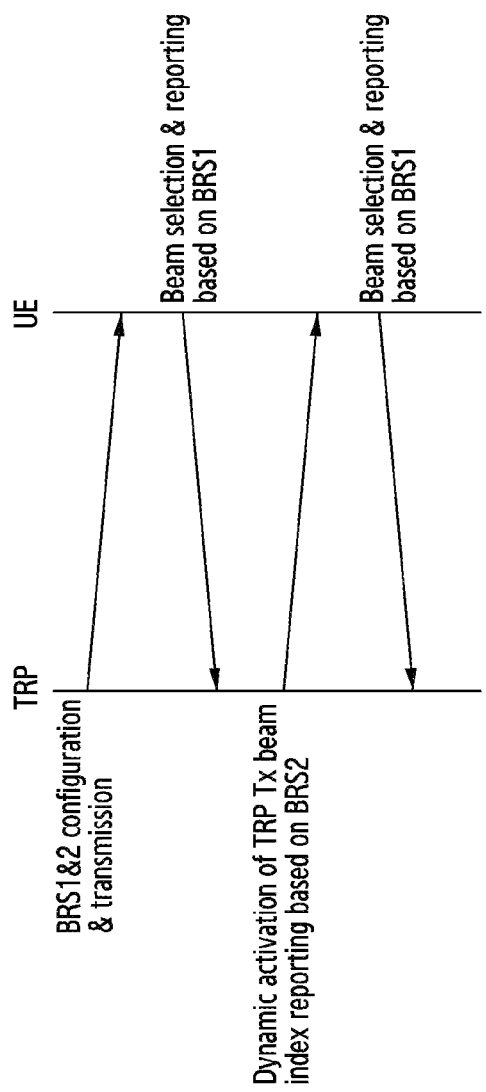
FIG. 5B illustrates a P-2 process based on two-level beam reference signal (BRSs) and TRP triggering which is an example of scenario 1 according to various embodiments of the present disclosure.

FIG. 5B illustrates a P-2 process based on two-level BRSs and TRP triggering which is an example of scenario 1 according to various embodiments of the present disclosure.

FIG. 5B illustrates operations of TRP-UE in the case of Step 1)-Alt 2 and P-2 triggering by a TRP in relation to scenario 1.

In scenario 1, P-3 may be solved by a UE implementation issue.

[Scenario 2]

Step 1) Configuration of a BRS to be used when P-1 operates;

Step 2) UE reporting for P-1;

Step 3) Configuration of an NZP CSI-RS and a ZP CSI-RS through an RRC signaling, for P-2/P-3;

Step 4) P-2 or P-3 triggering by a TRP or UE when necessary

: particularly, when a semi-persistent CSI-RS and an aperiodic CSI-RS are configured, Alt 1. Network triggering: a base station may specify a CSI-RS resource through DCI or MAC-CE. The base station may request a UE to report information on P-2 or P-3.

Figure 5C:
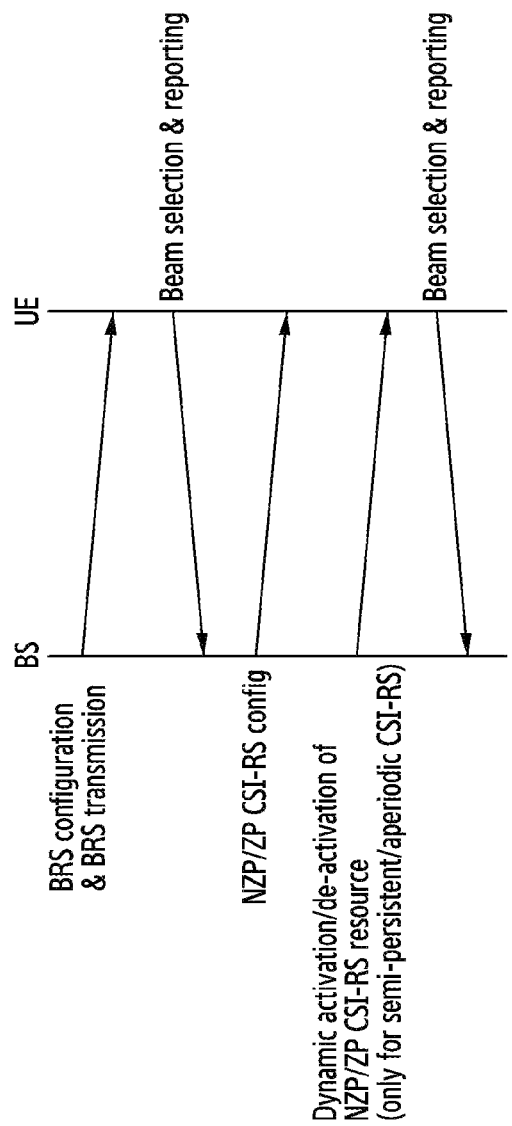
FIG. 5C illustrates an example of a network trigger in scenario 2 according to various embodiments of the present disclosure.

FIG. 5C illustrates an example of a network trigger in scenario 2 according to various embodiments of the present disclosure.

Alt 2. UE triggering: according to the need, the UE may request transmission of a CSI-RS. Then, the base station operates in a scheme identical/similar to that of Alt 1.

Figure 5D:
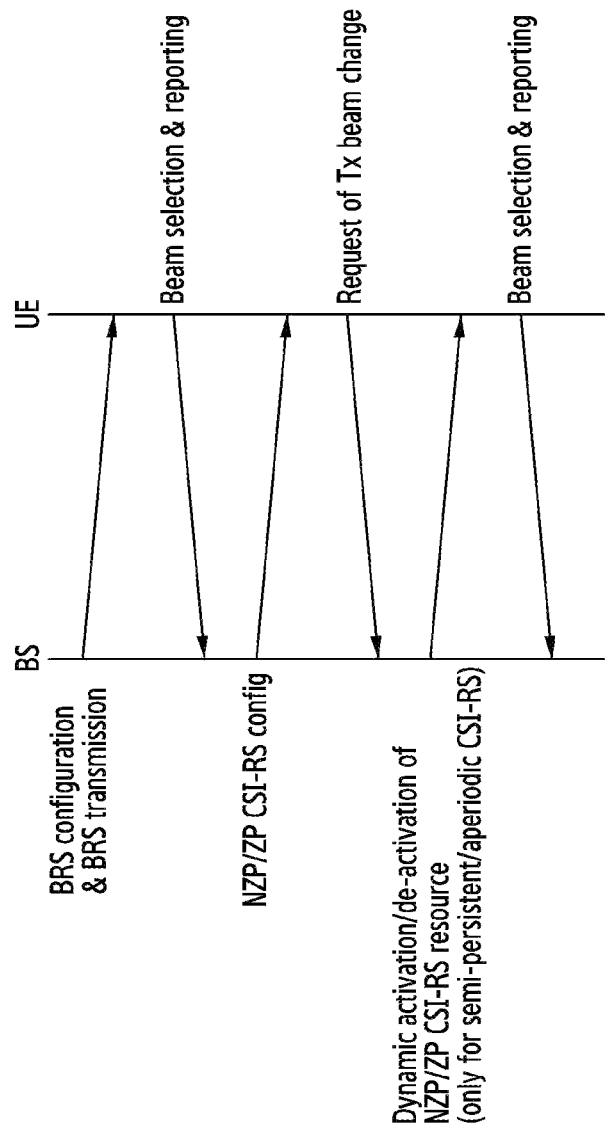
FIG. 5D illustrates an example of a user equipment (UE) trigger in scenario 2 according to various embodiments of the present disclosure.

FIG. 5D illustrates an example of a UE trigger in scenario 2 according to various embodiments of the present disclosure.

Step 5) UE reporting for P-2 or P-3.

Operations of the TRP-UE according to scenario 2 are illustrated in FIGS. 5C and 5D.

[Scenario 3]

Step 1) Configuration of an NZP CSI-RS and a ZP CSI-RS for operation of P-1/P-2/P-3 through an RRC signaling;

Step 2) UE reporting for P-1;

Step 3) P-2 or P-3 triggering by a TRP or UE when necessary

: particularly, when a semi-persistent CSI-RS and an aperiodic CSI-RS are configured, Alt 1. Network triggering: the network (i.e. base station, gNB) assigns a CSI-RS resource through DCI or MAC-CE and requests the UE to report information on P-2 or P-3, and Alt 2. UE triggering: the UE requests transmission of a relevant CSI-RS when recognizing the need of the relevant CSI-RS. A subsequent operation of the base station is identical to that of Alt 1; and Step 4) UE reporting for P-2 or P-3.

Figure 5E:
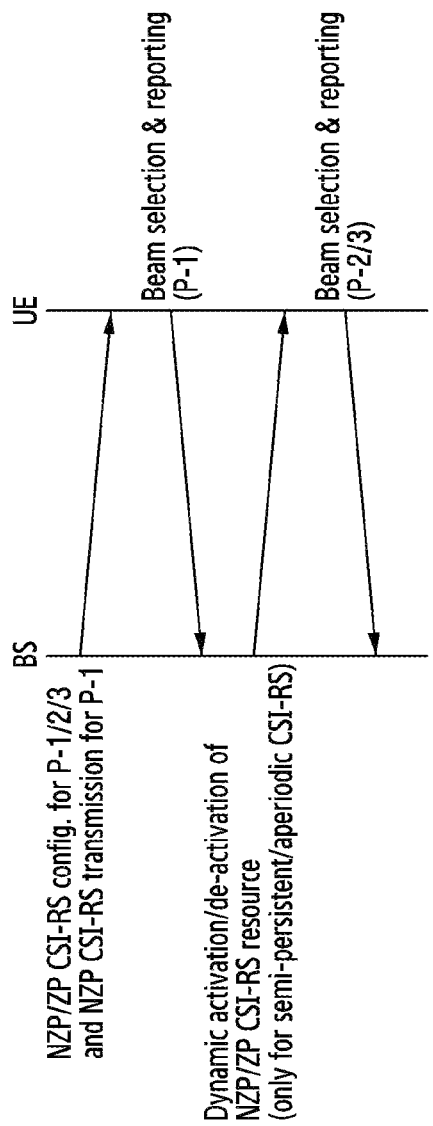
FIG. 5E illustrates an example of a network trigger in scenario 3 according to various embodiments of the present disclosure.

Operations of the TRP-UE according to scenario 3 are illustrated in FIG. 5E.

FIG. 5E illustrates an example of a network trigger in scenario 3 according to various embodiments of the present disclosure.

[Scenario 4]

Step 1) UE composite beam selection and reporting;

Step 2) Configuration of an NZP CSI-RS and/or a ZP CSI-RS for operation of P-1/P-2/P-3 through an RRC signaling : according to various embodiments of the present disclosure, an NZP CSI-RS for P-1 may be dependent on the number of composite beams. That is, when BRS 1 of scenario 1 is compared with a CSI-RS of scenario 3, it may be possible to operate a CSI-RS for P-1 with a relatively lean design;

Step 3) UE reporting on P-1;

Step 4) P-2 or P-3 triggering by a TRP or UE when necessary

: particularly, when a semi-persistent CSI-RS and an aperiodic CSI-RS are configured, Alt 1. Network triggering: the network (i.e. base station, gNB) specifies a CSI-RS resource through DCI or MAC-CE and requests the UE to report information on P-2 or P-3, and Alt 2. UE triggering: the UE requests transmission of a relevant CSI-RS when recognizing the need of the relevant CSI-RS. A subsequent operation of the base station is identical to that of Alt 1;

Step 5) UE reporting for P-2 or P-3;

Step 6) When an index of a preferred composite beam of the UE is changed, the UE reports, to the base station, the changed index information of the preferred composite beam;

Step 7) The base station applies the changed beam to a relevant CSI-RS resource for P-1; and Step 8) UE reporting by the UE for execution of P-1.

Figure 5F:
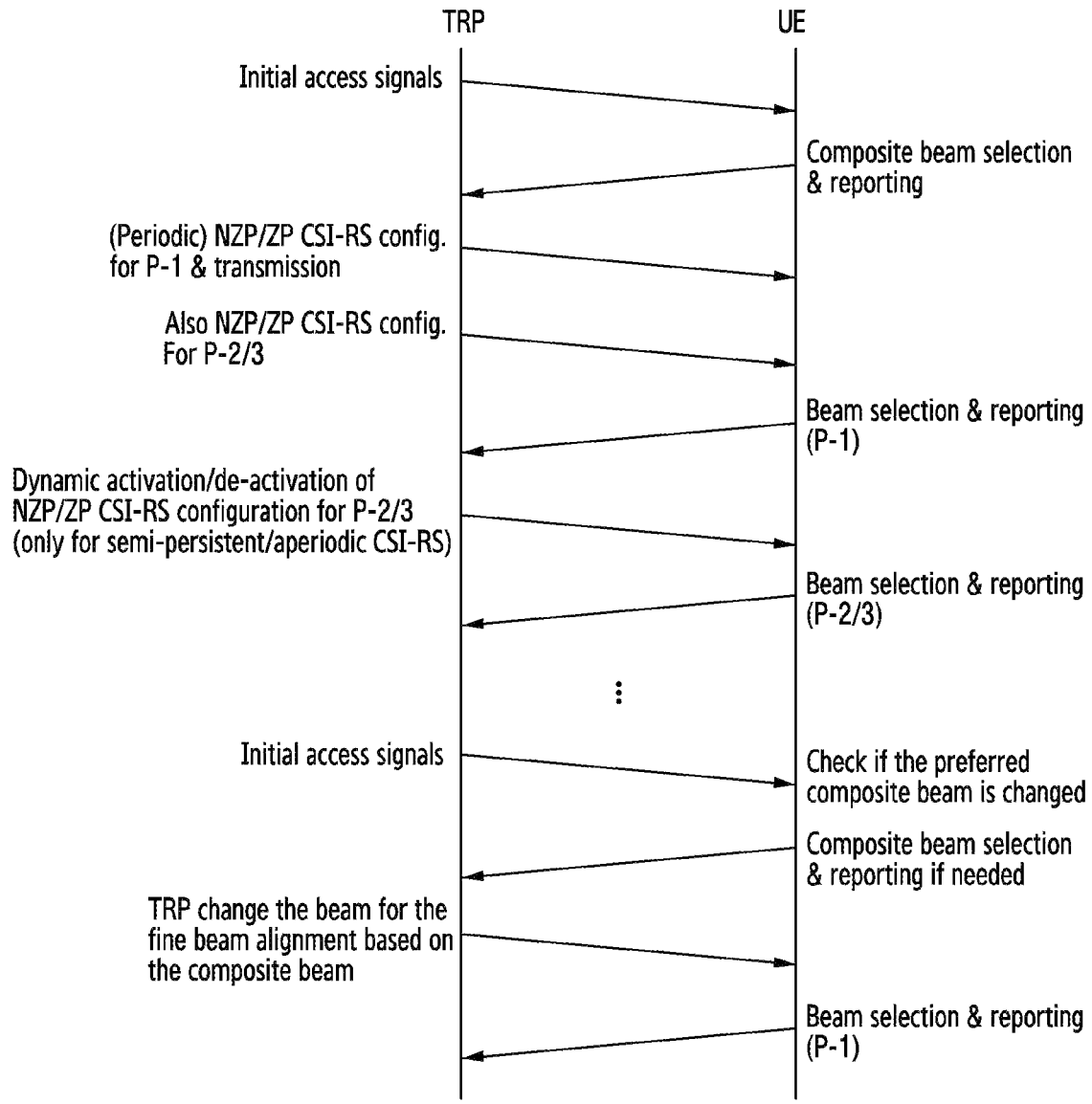
FIG. 5F illustrates an example of a network trigger in scenario 4 according to various embodiments of the present disclosure.

Operations of the TRP-UE according to scenario 4 are illustrated in FIG. 5F.

FIG. 5F illustrates an example of a network trigger in scenario 4 according to various embodiments of the present disclosure.

In scenario 4, a composite beam may signify a wide beam formed by combining multiple narrow beams used in downlink before a UE associates a transmission beam of a base station (e.g., a TRP Tx beam) with a reception beam of the UE (e.g., a UE Rx beam). According to various embodiments of the present disclosure, a composite beam may be utilized to transmit a synchronization and physical broadcast channel (PBCH) and the like.

Next, various and detailed embodiments of the present disclosure in one or more scenarios will be described.

[Two-Level BRSs: Applicable to Scenario 1]

When a cell-specific RS BRS1 is used for P-1 and P-3 and BRS2 is used for P-2 and P-3, BRS1 and BRS2 may be configured through identical or different physical channels. For example, BRS1 may be configured through a master information block (MIB), and then, whether BRS2 is configured through a system information block (SIB) or whether BRS2 is used in a SIB may be configured. Basically, only BRS1 may be used for measurement for handover. BRS2 configuration information may include the following parameters, and an embodiment of the BRS2 configuration information is illustrated in FIG. 5G.

Figure 5G:
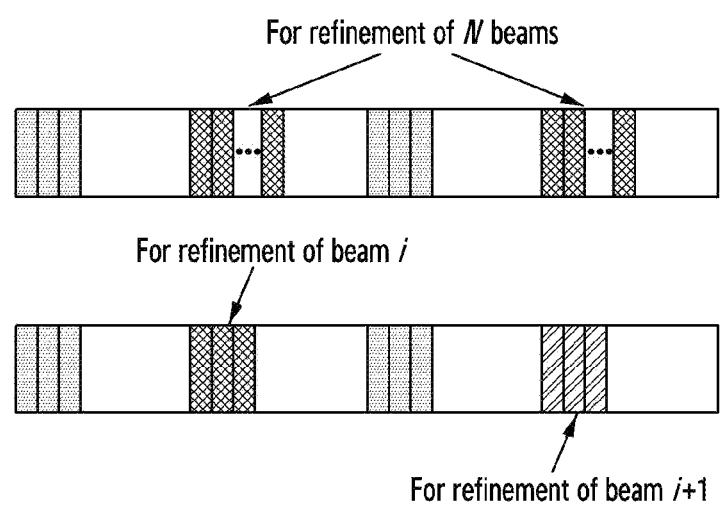
FIG. 5G illustrates an embodiment of two-level BRSs according to various embodiments of the present disclosure.

FIG. 5G illustrates an embodiment of two-level BRSs according to various embodiments of the present disclosure.

1. # of refinement symbols (# of orthogonal frequency division multiplexing (OFDM) symbols in BRS2), and 2. Periodicity.

[Configurable Cell-Specific RS: Applicable to Scenario 1/2]

According to various embodiments of the present disclosure, a system may determine that a periodicity of a cell-specific RS defined to perform P-1 is flexible. For example, when the number of UEs which are in a connected state in a cell is not large, a periodicity of a relevant RS may be kept long. A periodicity of the relevant RS may be configured through sync and system information. When a periodicity of the relevant RS is configured through sync, it is possible to distinguish periodicity configurations through a sequence of a primary synchronization signal (PSS), a secondary synchronization signal (SSS), or an extended synchronization signal (ESS).

[Configuration of UE-Specific RS for UE Capability-Based Beam Management: Applicable to Scenario 2/3/4]

According to various embodiments of the present disclosure, a UE may request a base station to configure an RS. That is, an RS for P-3 may be configured based on the request of the UE. The UE may transmit information related to the number of beams to a base station. For example, for refinement of a reception beam, the UE may notify a TRP of information related to the number of Rx beams for training. The information may be utilized to determine, for P-3, the number of repetitive transmissions of an RS to the UE in relation to a given TRP Tx beam. In other words, the information may include information for the number of repetitive transmissions of an RS (e.g., a CSI-RS). The information may be transmitted through a higher layer signaling, MAC-CE, or UCI. The number of Rx beams desired for training, which is requested by the UE, may be determined based on at least one of the number of transceiver units (TXRUs) possessed by the UE, whether multi-beam sweeping is to be performed, and the number of beams. In order for the UE to transmit the relevant information to the TRP, the following various schemes may be used.

Alt 1a. [applicable to all TRP/UE triggering situations] Scheme for transmitting the relevant information through message 3 (Msg3) during a random-access process, Alt 2a. [applicable to all TRP/UE triggering situations] Scheme for transmitting the relevant information through a UE capability negotiation process (e.g., UE capability information) after connection establishment, and Alt 3a. [applicable to only UE triggering situation] Scheme for transmitting the relevant information together with P-3 during transmission of a trigger request message.

A base station may determine the number of repetitions of an RS (e.g., a CSI-RS) on the basis of a request of a UE. For example, the base station may determine the number of repetitions of a CSI-RS on the basis of information (e.g., capability information) received from the UE, and may allocate resources by the number of repetitions. Information on a request for the number of repetitions of an RS in relation to a given TRP TX beam, which has been requested by the UE, may be determined by the base station (a base station that controls a TRP). The base station (a base station that controls a TRP) may accept a value, which has been requested by the UE, without any change according to a resource availability situation, and may determine the number of repetitions of the RS. Alternatively, the base station does not accept the value, but may determine the number of repetitions of the RS according to a different scheme. The UE may be notified of the number of repetitions of the RS in relation to the given TRP TX beam for P-3, which has been determined by the base station, according to the following schemes (for example, information for indicating the repetitions of the RS can be referred as the repetition information).

Alt 1b. [when UE request information is received through Alt 1a and Alt 2a] Method for including the repetition information during configuration of an NZP/ZP CSI-RS in an RRC (reconfiguration) signaling, and Alt 2b. [when UE request information is received through Alt 1a, Alt 2a, and Alt 3a] Method, when transmission of an NZP/ZP CSI-RS configured through an RRC (reconfiguration) signaling is activated through DCI/MAC-CE, for including together, the repetition information in it (DCF-MAC-CE).

[NZP/ZP UE-Specific RS for Beam Management: in Relation to Scenario 2/3/4]

According to various embodiments of the present disclosure, the configuration of an NZP CSI-RS for P-2 may include the following parameters.

1. # of antenna ports=# of TRP Tx beams in a single time instance,

2. # of OFDM symbols for refinement,

3. Resource configuration: a pattern (e.g., a start OFDM symbol number within a subframe (SF), and a start subcarrier index within a resource block (RB)), a CSI-RS transmission frequency resource (a sub-band or wide-band), and a start SF number within a frame, and 4. Periodicity: defined only in the case of a periodic CSI-RS.

According to various embodiments of the present disclosure, the configuration of an NZP CSI-RS for P-3 may include the following parameters.

1. # of repetitions of a CSI-RS: may be selected based on information on a request for the number of repetitions of an RS related to a given TRP Tx beam which is requested by a UE, 2. Resource configuration: a pattern (e.g., a start OFDM symbol number within an SF, and a start subcarrier index within an RB), a CSI-RS transmission frequency resource (a sub-band or wide-band), and a start SF number within a frame, and 3. Periodicity: defined only in the case of a periodic CSI-RS.

In some embodiments of the present disclosure, when information on the number of repetitions of an RS related to a given TRP Tx beam for P-3 is transmitted through DCI or MAC-CE, information on # (number) of repetitions of a CSI-RS may be excluded from the configuration of an NZP CSI-RS for P-3.

In some embodiments of the present disclosure, when configurations for P-2 and P-3 are independently configured, parameters within each configuration may be configured as described above. However, in some other embodiments of the present disclosure, when P-2 and P-3 are configured in an identical format, the parameters for the configuration may be as described below.

1. # of antenna ports=# of TRP Tx beams in a single time instance,

2. # of OFDM symbols for TRP Tx beam refinement,

3. # of repetitions of a CSI-RS: selected based on information on a request for the number of repetitions of an RS related to a given TRP Tx beam which is requested by a UE, 4. Resource configuration: a pattern (e.g., a start OFDM symbol number within an SF, and a start subcarrier index within an RB), a CSI-RS transmission frequency resource (a sub-band or wide-band), and a start SF number within a frame, and 5. Periodicity: defined only in the case of a periodic CSI-RS.

Figure 5H:
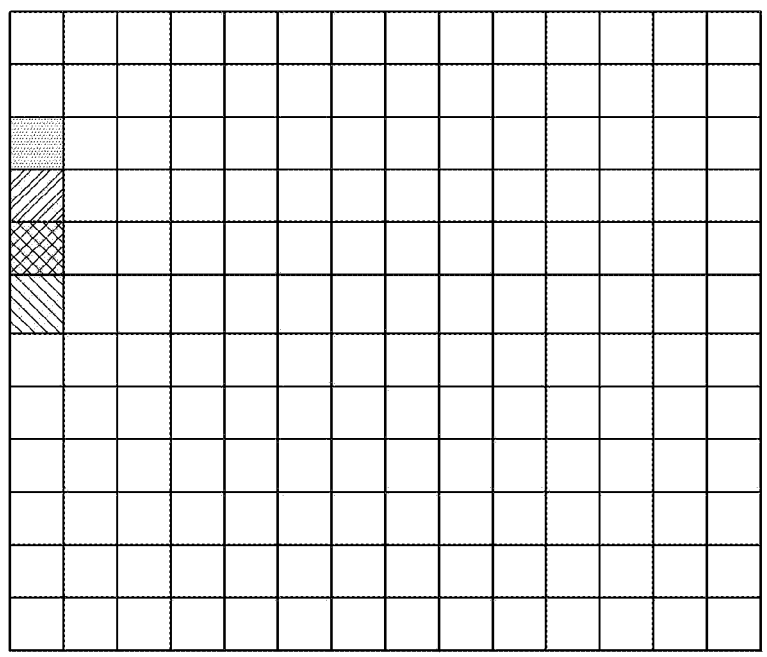
FIG. 5H illustrates an example of a channel state information-reference signal (CSI-RS) for P-2 according to various embodiments of the present disclosure.
Figure 5I:
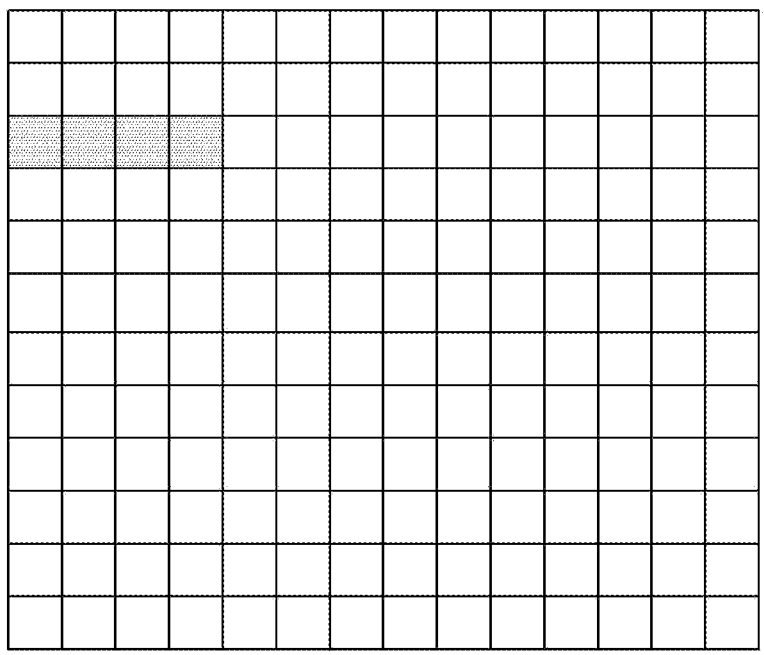
FIG. 5I illustrates an example of a CSI-RS for P-3 according to various embodiments of the present disclosure.
Figure 5J:
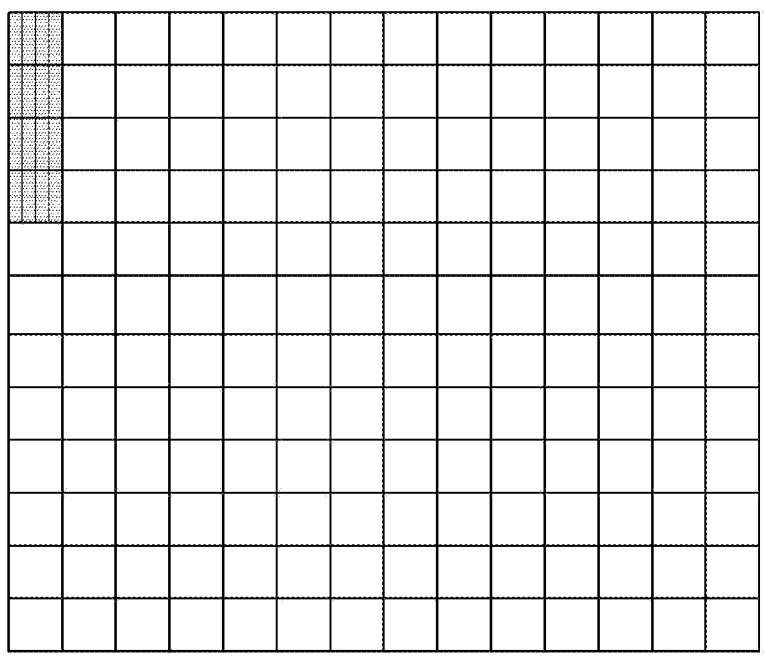
FIG. 5J illustrates another example of a CSI-RS for P-3 according to various embodiments of the present disclosure.

When P-2 and P-3 are configured in an identical format, multiple CSI-RS configurations (an ID may be assigned to each configuration) may be included in one CSI process within an RRC message. Thereafter, transmitting of a CSI-RS by using a corresponding configuration ID through DCI/MAC-CE may be activated. Hereinafter, FIGS. 5H, 5I, and 5J illustrate examples of CSI-RSs transmitted for P-2 and P-3. FIGS. 5H to 5J illustrate mapping on a one RB-by-one RB basis. In some embodiments of the present disclosure, this mapping may be repeated in all RBs in a system bandwidth (BW).

FIG. 5H illustrates an example of a CSI-RS for P-2 according to various embodiments of the present disclosure.

Referring to FIG. 5H, FIG. 5H illustrates an embodiment in which the parameters for configuration of a CSI-RS for P-2 are as follows:

1. # of antenna ports=4,

2. # of OFDM symbols for refinement=1, and

3. Start OFDM symbol number within an SF=0 and a start subcarrier index within an RB=2.

FIG. 5I illustrates an example of a CSI-RS for P-3 according to various embodiments of the present disclosure.

Referring to FIG. 5I, FIG. 5I illustrates an embodiment in which the parameters for configuration of a CSI-RS for P-3 are as follows:

1. # of repetitions of a CSI-RS=4, and
2. Start OFDM symbol number within an SF=0 and a start subcarrier index within an RB=2.

In the embodiment illustrated in FIG. SI, repetitive RSs are transmitted through consecutive symbols, but embodiments of the present disclosure are not limited thereto. In another embodiment of the present disclosure, RSs may be transmitted through non-consecutive symbols.

FIG. 5J illustrates another example of a CSI-RS for P-3 according to various embodiments of the present disclosure.

Referring to FIG. 5J, FIG. 5J illustrates an embodiment in which a wider subcarrier spacing is used for a CSI-RS for P-3, and parameters, some of which are different from those of the above-described configuration of an NZP CSI-RS for P-3, may be utilized. For example, the parameters are as follows:

1. # of repetitions of a CSI-RS in an OFDM symbol,
2. # of OFDM symbols for repetition,
3. Resource configuration: a pattern (e.g., a start OFDM symbol within an SF, and a start subcarrier index within an RB), a CSI-RS transmission frequency resource (a sub-band or wide-band), and a start SF number within a frame, and
4. Periodicity: defined only in the case of a periodic CSI-RS.

By increasing a subcarrier spacing of a CSI-RS, multiple CSI-RSs may be transmitted during one OFDM symbol duration. A CSI-RS may use a subcarrier spacing of the CSI-RS which is lengthened according to the # of repetitions representing the number of repetitions of the CSI-RS. Alternatively, after a subcarrier spacing of a CSI-RS for P-3 is predesignated (e.g., 4 to 10 subcarriers), as many as corresponding sub-symbols may be used to transmit the CSI-RS. For example, when a subcarrier spacing of a CSI-RS for P-3 is limited to a distance equal to four times a subcarrier spacing for data:

i) When an RS is desired to be repeated four times, one OFDM symbol (one OFDM symbol includes four sub-symbols) is used to transmit a CSI-RS.

ii) When an RS is desired to be repeated eight times, two OFDM symbols are used to transmit a CSI-RS.

The configuration of a ZP CSI-RS for P-2 and P-3 may include the following parameters.

1. # of antenna ports=# of beams in a single time instance,
2. # of OFDM symbols: related to # of OFDM symbols for TRP Tx beam refinement and # of a repeated RS,
3. # of repetitions of a CSI-RS in an OFDM symbol (used only when a subcarrier spacing for a CSI-RS is adjusted),
4. Resource configuration: a pattern (e.g., a start OFDM symbol number within an SF, and a start subcarrier index within an RB), a CSI-RS transmission frequency resource (a sub-band or wide-band), and a start SF number within a frame, and
5. Periodicity: defined only in the case of configuration of a ZP CSI-RS for a periodic CSI-RS.

[Utilization scenario of two types of P-1's ((1) P-1 for typical (periodic) TRP Tx/UE Rx beam association, and (2) P-1 for a situation where a TRP Tx/UE Rx beam needs to be suddenly changed) and related procedures: applicable to scenario 1/2/3/4]

As an RS for supporting P-1, a periodic or aperiodic type of RS may be configured. A periodic RS may be transmitted for initial TRP Tx-UE Rx beam association and subsequent update, and refers to the above-introduced RS for P-1. An aperiodic RS may be transmitted for the purpose that beams currently associated with each other are determined to be inappropriate and a TRP Tx-UE Rx beam is desired to be suddenly changed. According to various embodiments of the present disclosure, an aperiodic RS may be initiated by a base station of an aperiodic RS (network-based triggering) or be initiated by a request of a UE (UE-based triggering).

As an RS pattern capable of being predesignated between a TRP and a UE of an aperiodic RS for supporting P-1, the following Alts exist.

Alt 1. A base station may repetitively transmit an RS designated for P-1 by the value determined based on the above-described UE beam sweeping capability. At this time, according to various embodiments of the present disclosure, RSs designated for P-1 may be mapped to consecutive symbols or SFs.

Alt 2. A base station may use RSs configured for P-2 and P-3.

When transmission of an RS (i.e. aperiodic RS for P-1) is activated through DCI/MAC-CE in relation to Alt 2, P-2/P-3 may operate in the form of simultaneously activating the transmission of an RS.

Figure 5K:
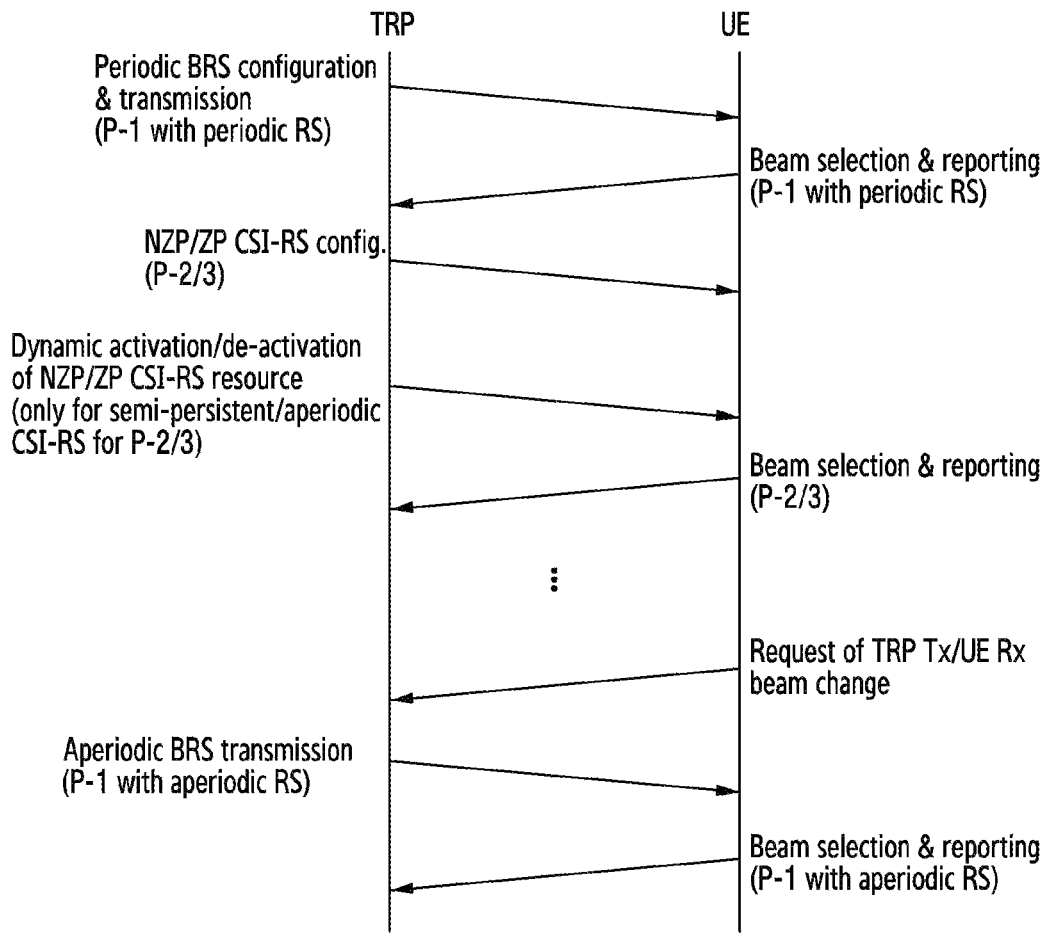
FIG. 5K illustrates an example of an aperiodic RS for P-1 according to various embodiments of the present disclosure.

FIG. 5K illustrates an example of an aperiodic RS for P-1 according to various embodiments of the present disclosure.

FIG. 5K illustrates operations of TRP-UE related to an aperiodic RS for P-1 according to a request of a UE in scenario 2.

Methods according to claims of the present disclosure or embodiments described in the specification of the present disclosure may be implemented in the form of hardware, software, or a combination of hardware and software.

When the methods are implemented in software, a computer-readable storage medium that stores one or more programs (software modules) may be provided. The one or more programs stored in the computer-readable storage medium may be configured for execution by one or more processors within an electronic device. The one or more programs may include instructions which cause the electronic device to perform the methods according to the claims of the present disclosure or the embodiments described in the specification of the present disclosure.

The programs (software modules or software) may be stored in random access memories, non-volatile memories including flash memories, read-only memories (ROMs), electrically erasable programmable ROM (EEPROMs), magnetic disc storage devices, compact disc-ROMs (CD-ROMs), digital versatile discs (DVDs), other types of optical storage devices, or magnetic cassettes. Alternatively, the programs may be stored in a memory configured by a combination of some or all of such storage devices. Also, each of the memories may be provided in plurality.

Further, the programs may be stored in an attachable storage device that can be accessed by the electronic device through a communication network such as the Internet, Intranet, local area network (LAN), wireless LAN (WLAN), or storage area network (SAN), or through a communication network configured by a combination thereof. This storage device may be connected through an external port to the electronic device performing embodiments of the present disclosure. Alternatively, a separate storage device on a communication network may be connected to the electronic device performing embodiments of the present disclosure.

In the above-described specific embodiments of the present disclosure, the elements included in the present disclosure are expressed in a singular form or a plural form according to the proposed specific embodiment. However, the singular or plural expression is selected appropriately for the situation proposed for convenience of description, the present disclosure is not limited to a single element or multiple elements, and the elements expressed in a plural form may be configured as a single element or an element expressed in a singular form may be configured as multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a base station (BS) in a wireless communication system, the method comprising:
   receiving, from a terminal, capability information of a number of receive beams of the terminal;
   transmitting, to the terminal, configuration information regarding channel state information-reference signal (CSI-RS); and
   transmitting, to the terminal, reference signals based on the configuration information of the CSI-RS,
   wherein the configuration information includes:
      resource information for indicating a plurality of CSI-RS resources, and
      repetition information for indicating that the reference signals on the plurality of CSI-RS resources are transmitted with a same transmit beam of the BS, and
   wherein the reference signals on the plurality of CSI-RS resources are transmitted in different orthogonal frequency division multiplexing (OFDM) symbols, and
   wherein the capability information is associated with a number of repetitions associated with the plurality of CSI-RS resources.

2. The method of claim 1,
   wherein the resource information includes information regarding a periodicity for the plurality of CSI-RS resources, and
   wherein the reference signals comprise CSI-RSs transmitted by using the same transmit beam of the BS within the periodicity.

3. The method of claim 1,
   wherein the resource information includes:
      a number of antenna ports for the plurality of CSI-RS resources,
      a start OFDM symbol number within a resource block used for CSI-RS transmission, and
      frequency resources for the plurality of CSI-RS resources, and
   wherein the configuration information is transmitted based on a radio resource control (RRC) signaling.

4. The method of claim 1
   wherein the reference signals comprise user equipment (UE)-specific CSI-RSs, and
   wherein the same transmit beam of the BS is associated with a downlink signal for synchronization and physical broadcast channel (PBCH).

5. A method for operating a terminal in a wireless communication system, the method comprising:
   transmitting, to a base station (BS), capability information of a number of receive beams of the terminal;
   receiving, from a base station (the BS), configuration information regarding channel state information-reference signals (CSI-RS); and
   receiving, from the BS, reference signals based on the configuration information of the CSI-RS,
   wherein the configuration information includes:
      resource information for indicating a plurality of CSI-RS resources, and
      repetition information for indicating that the reference signals on the plurality of CSI-RS resources are transmitted with a same transmit beam of the B,
   wherein the signals on the plurality of CSI-RS resources are transmitted in different orthogonal frequency division multiplexing (OFDM) symbols, and
   wherein the capability information is associated with a number of repetitions associated with the plurality of CSI-RS resources.

6. The method of claim 5,
   wherein the resource information includes information regarding a periodicity for the plurality of CSI-RS resources, and
   wherein the reference signals comprise CSI-RSs transmitted by using the same transmit beam of the BS within the periodicity.

7. The method of claim 5,
   wherein the resource information includes:
      a number of antenna ports for the plurality of CSI-RS resources,
      a start OFDM symbol number within a resource block used for CSI-RS transmission, and
      frequency resources for the plurality of CSI-RS resources, and
   wherein the configuration information is transmitted based on a radio resource control (RRC) signaling.

8. The method of claim 5, further comprising:
   wherein the reference signals comprise user equipment (UE)-specific CSI-RSs, and
   wherein the same transmit beam of the BS is associated with a downlink signal for synchronization and physical broadcast channel (PBCH).

9. A base station (BS) in a wireless communication system, the BS comprising:
   at least one transceiver; and
   at least one processor connected to the at least one transceiver,
   wherein the at least one transceiver is configured to:
      receive, from a terminal, capability information of a number of receive beams of the terminal,
      transmit, to the terminal, configuration information regarding channel state information-reference signal (CSI-RS), and
      transmit, to the terminal, reference signals based on the configuration information of the CSI-RS
   wherein the configuration information includes:
      resource information for indicating a plurality of CSI-RS resources, and
      repetition information for indicating that signals on the plurality of CSI-RS resources are transmitted with a same transmit beam of the BS,
   wherein the signals on the plurality of CSI-RS resources are transmitted in different orthogonal frequency division multiplexing (OFDM) symbols, and
   wherein the capability information is associated with a number of repetitions associated with the plurality of CSI-RS resources.

10. The BS of claim 9,
wherein the resource information includes information regarding a periodicity for the plurality of CSI-RS resources, and
wherein the reference signals comprise CSI-RSs transmitted by using the same transmit beam of the BS within the periodicity.

11. The BS of claim 9,
wherein the resource information includes:
a number of antenna ports for the plurality of CSI-RS resources,
a start OFDM symbol number within a resource block used for CSI-RS transmission, and
frequency resources for the plurality of CSI-RS resources, and
wherein the configuration information is transmitted based on a radio resource control (RRC) signaling.

12. The BS of claim 9,
wherein the reference signals comprise user equipment (UE)-specific CSI-RSs, and
wherein the same transmit beam of the BS is associated with a downlink signal for synchronization and physical broadcast channel (PBCH).

13. A terminal in a wireless environment, the terminal comprising:
at least one transceiver; and
at least one processor connected to the at least one transceiver,
wherein the at least one processor is configured to:
transmit, to a base station (BS), capability information of a number of receive beams of the terminal,
receive, from the BS, configuration information regarding channel state information-reference signal (CSI-RS), and
receive, from the BS, reference signals based on the configuration information of the CSI-RS,
wherein the configuration information includes:
resource information for indicating a plurality of CSI-RS resources, and
repetition information for indicating that reference signals on the plurality of CSI-RS resources are transmitted with a same transmit beam of the BS,
wherein the reference signals on the plurality of CSI-RS resources are transmitted in different orthogonal frequency division multiplexing (OFDM) symbols, and
wherein the capability information is associated with a number of repetitions associated with the plurality of CSI-RS resources.

14. The terminal of claim 13,
wherein the resource information includes information regarding a periodicity for the plurality of CSI-RS resources, and
wherein the reference signals comprise CSI-RSs transmitted by using the same transmit beam of the BS within the periodicity.

15. The terminal of claim 13,
wherein the resource information includes:
a number of antenna ports for the plurality of CSI-RS resources,
a start OFDM symbol number within a resource block used for CSI-RS transmission, and
frequency resources for the plurality of CSI-RS resources, and
wherein the configuration information is transmitted based on a radio resource control (RRC) signaling.

16. The terminal of claim 13,
wherein the reference signals comprise user equipment (UE)-specific CSI-RSs, and
wherein the same transmit beam of the BS is associated with a downlink signal for synchronization and physical broadcast channel (PBCH).

17. The method of claim 1, further comprising:
transmitting, by using transmit beams of the BS, downlink signals for synchronization and physical broadcast channel (PBCH); and
receiving, from the terminal, feedback information regarding at least one of the transmit beams of the BS,
wherein the same transmit beam is associated with at least one of the downlink signals.

18. The method of claim 1, further comprising:
transmitting, to the terminal, medium control access (MAC) control element (CE) for an activation or deactivation of the plurality of CSI-RS resources,
wherein the configuration information is transmitted based on a radio resource control (RRC) signaling,
wherein the resource information comprises information for indicating a periodicity for the plurality of CSI-RS resources, and
wherein the CSI-RS comprises a semi persistent CSI-RS.

19. The method of claim 5, further comprising:
receiving, from the BS, by using transmit beams of the BS, downlink signals for synchronization and physical broadcast channel (PBCH); and
transmitting, to the BS, feedback information regarding at least one of the transmit beams of the BS,
wherein the same transmit beam is associated with at least one of the downlink signals.

20. The method of claim 5, further comprising:
receiving, from the BS, medium control access (MAC) control element (CE) for an activation or deactivation of the plurality of CSI-RS resources,
wherein the configuration information is transmitted based on a radio resource control (RRC) signaling,
wherein the resource information comprises information for indicating a periodicity for the plurality of CSI-RS resources, and
wherein the CSI-RS comprises a semi persistent CSI-RS.

21. The BS of claim 9,
wherein the at least one transceiver is further configured to:
transmit, by using transmit beams of the BS, downlink signals for synchronization and physical broadcast channel (PBCH), and
receive, from the terminal, feedback information regarding at least one of the transmit beams of the BS, and
wherein the same transmit beam is associated with at least one of the downlink signals.

22. The BS of claim 9,
wherein the at least one transceiver is further configured to transmit, to the terminal, medium control access (MAC) control element (CE) for an activation or deactivation of the plurality of CSI-RS resources,
wherein the configuration information is transmitted based on a radio resource control (RRC) signaling,
wherein the resource information comprises information for indicating a periodicity for the plurality of CSI-RS resources, and
wherein the CSI-RS comprises a semi persistent CSI-RS.

23. The terminal of claim 13,
wherein the at least one transceiver is further configured to:

receive, from the BS, by using transmit beams of the BS, downlink signals for synchronization and physical broadcast channel (PBCH); and transmit, to the BS, feedback information regarding at least one of the transmit beams of the BS, wherein the same transmit beam is associated with at least one of the downlink signals.

24. The terminal of claim 13, wherein the at least one transceiver is further configured to receiving, from the BS, medium control access (MAC) control element (CE) for an activation or deactivation of the plurality of CSI-RS resources, wherein the configuration information is transmitted based on a radio resource control (RRC) signaling, wherein the resource information comprises information for indicating a periodicity for the plurality of CSI-RS resources, and wherein the CSI-RS comprises a semi persistent CSI-RS.

25. A method for operating a base station (BS) in a wireless communication system, the method comprising:

receiving, from a terminal, capability information of a number of receive beams of the terminal;

transmitting, to the terminal, configuration information regarding a channel state information-reference signal (CSI-RS) including:

resource information for indicating a plurality of CSI-RS resources including a first CSI-RS resource and a second CSI-RS resource, and repetition information for indicating that reference signals on the plurality of CSI-RS resources are transmitted with a same transmit beam of the BS, wherein the reference signals on the plurality of CSI-RS resources are transmitted in different orthogonal frequency division multiplexing (OFDM) symbols;

transmitting, to the terminal, a first reference signal on the first CSI-RS resource by using a transmit beam of the BS; and transmitting, to the terminal, a second reference signal on the second CSI-RS resource to by using the transmit beam of the BS, wherein the capability information is associated with a number of repetitions associated with the plurality of CSI-RS resources.

26. A method for operating a terminal in a wireless communication system, the method comprising:

transmitting, to a base station (BS), capability information of a number of receive beams of the terminal;

receiving, from the BS, configuration information regarding a channel state information-reference signal (CSI-RS) including:

resource information for indicating a plurality of CSI-RS resources including a first CSI-RS resource and a second CSI-RS resource, and repetition information for indicating that reference signals on the plurality of CSI-RS resources are transmitted with a same transmit beam of the BS, wherein the reference signals on the plurality of CSI-RS resources are transmitted in different orthogonal frequency division multiplexing (OFDM) symbols;

receiving a first reference signal on the first CSI-RS resource from the BS, the first reference signal transmitted by using a transmit beam of the BS; and receiving a second reference signal on the second CSI-RS resource from the BS, the second reference signal transmitted by using the transmit beam of the BS, wherein the capability information is associated with a number of repetitions associated with the plurality of CSI-RS resources.

27. A base station (BS) in a wireless communication system, the BS comprising:

at least one transceiver; and at least one processor connected to the at least one transceiver, wherein the at least one transceiver is configured to:

receive, from a terminal, capability information of a number of receive beams of the terminal, transmit, to the terminal, configuration information regarding a channel state information-reference signal (CSI-RS) including:

resource information for indicating a plurality of CSI-RS resources including a first CSI-RS resource and a second CSI-RS resource, and repetition information for indicating that reference signals on the plurality of CSI-RS resources are transmitted with a same transmit beam of the BS, wherein the reference signals on the plurality of CSI-RS resources are transmitted in different orthogonal frequency division multiplexing (OFDM) symbols, transmit, to the terminal, a first reference signal on the first CSI-RS resource by using a transmit beam of the BS, and transmit, to the terminal, a second reference signal on the second CSI-RS resource by using the transmit beam of the BS, wherein the capability information is associated with a number of repetitions associated with the plurality of CSI-RS resources.

28. A terminal in a wireless communication system, the terminal comprising:

at least one transceiver; and at least one processor connected to the at least one transceiver, wherein the at least one transceiver is configured to:

transmit, to a base station (BS), capability information of a number of receive beams of the terminal, receive, from the BS, configuration information regarding a channel state information-reference signal (CSI-RS) including:

resource information for indicating a plurality of CSI-RS resources including a first CSI-RS resource and a second CSI-RS resource, and repetition information for indicating that reference signals on the plurality of CSI-RS resources are transmitted with a same transmit beam of the BS, wherein the reference signals on the plurality of CSI-RS resources are transmitted in different orthogonal frequency division multiplexing (OFDM) symbols, receive a first reference signal on the first CSI-RS resource from the BS, the first reference signal transmitted by using a transmit beam of the BS, and receive a second reference signal on the second CSI-RS resource from the BS, the second reference signal transmitted by using the transmit beam of the BS, wherein the capability information is associated with a number of repetitions associated with the plurality of CSI-RS resources.

* * * * *

UNITED STATES PATENT AND TRADEMARK OFFICE
CERTIFICATE OF CORRECTION

| | | |
|---|---|---|
| PATENT NO. | : 10,659,123 B2 | Page 1 of 1 |
| APPLICATION NO. | : 15/802997 | |
| DATED | : May 19, 2020 | |
| INVENTOR(S) | : Namjeong Lee et al. | |

It is certified that error appears in the above-identified patent and that said Letters Patent is hereby corrected as shown below:

In the Claims

Claim 5, Column 18, Line 1, "a base station (the BS)" should read -- the BS --.

Claim 5, Column 18, Line 11, "B" should read -- BS --.

Claim 24, Column 21, Line 10, the word "receiving" should read -- receive --.

Signed and Sealed this
Second Day of May, 2023

Katherine Kelly Vidal
*Director of the United States Patent and Trademark Office*